April 29, 1969     H. H. FRONICKE     3,441,043

HYDRAULIC UNLOADING VALVE

Filed Sept. 30, 1966

INVENTOR
HERBERT HERMANN FRONICKE

By Jacobs & Jacobs

ATTORNEYS

United States Patent Office 3,441,043
Patented Apr. 29, 1969

3,441,043
HYDRAULIC UNLOADING VALVE
Herbert Hermann Fronicke, Tauton, Somerset, England, assignor to R. B. Bolton (Hydraulics) Limited, Consett, England, a company of Great Britain and Northern Ireland
Filed Sept. 30, 1966, Ser. No. 583,326
Claims priority, application Great Britain, Aug. 4, 1966, 35,046/66
Int. Cl. G01d 7/01; F16k 15/02
U.S. Cl. 137—108                                    4 Claims

ABSTRACT OF THE DISCLOSURE

A hydraulic unloading valve is constructed which comprises an inlet port, a supply port and an exhaust port within a body, a space within the body providing communication among the three ports, a non-return valve disposed within the supply port, a branch or side body disposed in line with the exhaust port, a valve seat in the exhaust port, a piston slidable in the chamber, resilient means bearing on the piston, a plunger connected to the piston, the head of said plunger serving as a valve to engage the seat in the exhaust port, and a duct within the body extending from the piston chamber to the supply port on the outlet side of the non-return valve.

---

This invention has for an object to provide, for use in a hydraulic system, an improved unloading valve which is simple in construction, affords a range of adjustability for unloading pressure differential, and is free from liability to become blocked up by dirt or other solid matter in the hydraulic fluid.

A further object of the invention is to provide an unloading valve to be inserted in a system between a hydraulic pump and at least one apparatus which consumes hydraulic fluid, which valve operates automatically when said apparatus temporarily ceases to consume fluid (for example, a hydraulic spray device rendered inoperative by closure of a stopcock, or a hydraulic ram attaining the limit of its stroke) to bypass fluid delivered by the pump to a storage reservoir or to the pump intake; and to effect the bypassing of fluid rapidly on the creation of a predetermined pressure, slightly greater than the operating pressure, in said apparatus, to relieve the pump of load and enable it to continue working under low delivery pressure until further supply of fluid to said apparatus is required.

According to the invention, a hydraulic unloading valve comprises a body, an inlet port, a supply port and an exhaust port in said body, a non-return valve within said supply port, a chamber enclosed in a branch on said body, a piston slidable in said chamber, resilient means bearing on the piston, a plunger connected to the piston, a valve seat in said exhaust port, a head on said plunger serving as a valve to engage said seat, and a duct extending from said piston chamber to the supply port on the outlet side of said non-return valve therein.

Said body may enclose a space which communicates with said three ports, said valve seat and said valve being disposed to form a closure between said space and said exhaust port. The valve may further comprise a branch opposed to said exhaust port, said piston chamber located in said branch, an aperture in said body axially aligned with said exhaust port and extending between said space in said chamber said plunger extending through said aperture, sealing means located in said aperture about said plunger, said duct extending to the piston chamber on the inner side of the piston and said resilient means bearing on the outer side of the piston, and an element may be adjustably mounted on said branch to serve as an abutment for said resilient means.

Figure 1:
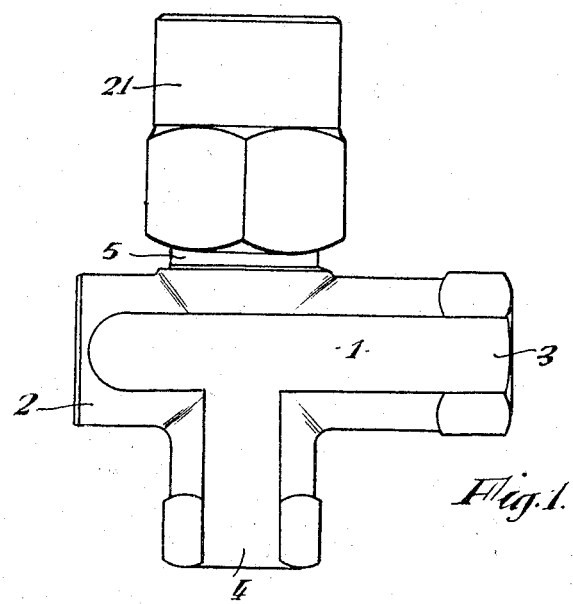
Figure 2:
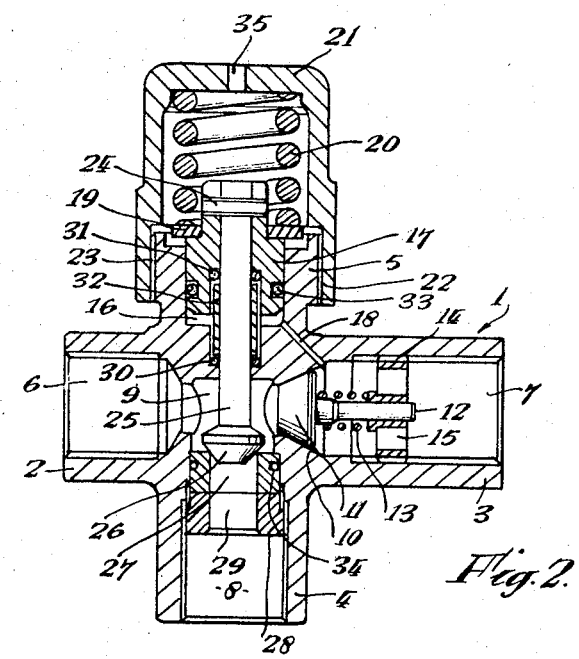

The features of an unloading valve as recited, and its mode of operation, will be better understood from the following description, by way of example, of an embodiment thereof with reference to the accompanying drawings, wherein:

FIG. 1 is a side elevation of the valve, and
FIG. 2 is a section of the same on its median plane.

As shown in the drawings, the valve comprises a body 1 having an inlet branch 2, a supply branch 3 and an exhaust branch 4, and in alignment with and opposite to said exhaust branch another branch 5 housing a control piston. As shown in FIG. 2, the inlet, supply and exhaust branches 2, 3 and 4 respectively present internally screw-threaded ports 6, 7 and 8 communicating, subject to control as will be referred to, with a central space 9. The inner end of the supply port 7 has a conical face 10 which is engaged by a non-return valve 11 mounted on a stem 12 and held against the seat or face 10 by a spring 13 which bears upon the base of the valve and upon a nut 14, which is screwed into the supply port 7 and has a series of apertures 15 for the passage of hydraulic fluid.

The branch 5 presents internally a cylindrical chamber 16 within which is slidable a piston 17, and the lower end of said chamber 16 communicates by way of a duct 18 with the interior of the supply port 7 beyond or on the outer side of the non-return valve 11. The outer side of the piston 17 carries an annular element 19 upon which bears a spring 20, the outer end of said spring engaging the inner surface of the top of a cap 21 which has a screw-threaded skirt 22 engaged upon an external screw-thread 23 of the branch 5. A vent hole 35 is provided in the cap 21 to prevent the accumulation therein of fluid under pressure by leakage past the piston.

Secured concentrically in a bore in the piston 17, by means of a transverse pin 24, is a plunger 25 having at its lower end an enlargement in the form of a conical head 26. This head serves as a valve to engage a seat presented by an apertured seat element 27, secured in the inner end of the exhaust port 8, by a nut 28 which is screwed into said port and has a central aperture 29 aligned with the aperture in the seat element 27.

To prevent passage of fluid from the central space 9 into the piston chamber 16 about the plunger 25, a seal ring 30 is housed in an enlarged part of the aperture in the body through which said plunger passes, this seal ring and another similar seal ring 31, surrounding the plunger in a recess in the piston, being held in their respective positions by a sleeve 32 mounted on the plunger. The piston also has an external annular recess within which is located a further seal ring 33 to prevent leakage of fluid past the piston, and the seat member 27 likewise has an external annular groove in which is located another seal ring 34 to prevent leakage of fluid to the exhaust port when the valve 26 is engaged upon its seat.

An unloading valve as described is intended to be fitted in a hydraulic system between a supply line from a pump, connected into the inlet port 6, and at least one hydraulic machine connected through a stop-valve by ducting into the supply port 7. A duct connected into the exhaust port 8 extends to a tank or reservoir for hydraulic fluid, or into the pump inlet circuit.

In operation, when fluid under pressure is pumped into the central chamber 9 it will flow past the non-return valve 11 and out of the supply port 7 to a machine or machines connected to said supply port, until further flow is prevented by the closure of a valve or by the hydraulic machine (for example, a hydraulic ram) completing its function and becoming incapable of receiving more fluid. The same effect will be caused by the closure of a stop-valve in a system connected to the supply port 7. In the course of such flow, fluid will also pass through the duct 18 in the valve body to the piston chamber 16 and apply pressure to the lower face of the piston 17 in opposition to the force of the spring 20. The stress in the spring 20 is adjusted by means of the cap 21 to ensure that the piston 17 is not moved by the fluid pressure until the latter reaches the required operating pressure of the machine or machines connected to the supply port 7.

Eventually, when a machine completes its operation, or a stop-valve in a system connected to the supply branch 7 is closed, pressure in said branch will build up until the piston 16 is displaced so as to raise the valve head 26 from its seat 27. Thereupon the supply fluid is discharged through the exhaust port 8 and pressure in the central chamber 9 is decreased or unloaded so that the non-return valve 11 closes to maintain the operating pressure in the system connected to the supply port 7, said port itself and the piston chamber 16. The fluid delivered by the pump now returns to the reservoir or is recirculated at no load or pressure, thereby saving consumption of power and wear in the pump. As soon as pressure in the supply port 7 falls, for example, by the opening of another stop-valve to supply fluid to another machine, or by the need to operate again a machine which has been cut-off from the supply and exhausted, pressure in the supply port 7 and the piston chamber 16 will drop, permitting the spring 20 to depress the piston and close the valve 26 upon its seat 27, whereby the pressure of fluid delivered by the pump builds up in the space 9 and opens the non-return valve 11 to deliver further fluid through the supply port 7.

The opening and closing differential is a function of the following:

At the moment fluid-pressure reaches the point of lifting the piston 17, pressures in chamber 9, duct 18 and piston chamber 16 (neglecting friction and check-valve spring resistance 13) are equal. Upon head 26 lifting off its seat, fluid pressure in chamber 9 will fall in accordance with the amount of lift of plunger 25 and pressure drop associated with the established annular orifice. This in turn means (provided there is sufficient liquid bulk in supply port 7 and associated machinery) the progressive failure of a valve closing force created by the differential area of plunger diameter 25 and seat diameter 27, thus permitting fluid in and beyond the supply port 7 to lift the piston 17 further against the spring 20 and open the valve 26 until the pressure in the chamber 9 reaches a very low value and almost equals that in the exhaust port 8. Opening and closing pressure differentials may be varied by altering the differential area between plunger diameter 25 and seat diameter 27, coupled with the area of piston 17 and rate of the spring 20.

What I claim and desire to protect by Letters Patent is:

1. A hydraulic unloading valve comprising a body having a central space therein and arms which provide, respectively, an inlet port, a supply port and an exhaust port, a branch on said body located in line with the exhaust port, the central space communicating with said three ports and lying between said branch and the exhaust port, a non-return valve disposed within said supply port, a valve seat in said exhaust port, a chamber in said branch, a piston slidable in said chamber, resilient means bearing on the piston, a plunger connected to the piston, a head on said plunger serving as a valve to engage said seat in the exhaust port, and a duct within said body extending from said piston chamber to the supply port on the outlet side of said non-return valve therein.

2. An unloading valve as claimed in claim 1 wherein said resilient means comprise a compression coil spring, and further comprising an external screw thread on said branch, and an internally screw-threaded cap mounted on said branch to serve as an adjustable abutment for said spring.

3. An unloading valve as claimed in claim 1, wherein said body is cruciform, the inlet port and exhaust port being in axial alignment and at right angles to the axis of the exhaust port and of said branch.

4. An unloading valve as claimed in claim 1 further comprising a frusto-conical seat at the inner end of said supply port and an internally screw-threaded bore in the outer part of said supply port, said non-return valve comprising a frusto-conical head to engage said seat and a coaxial shank, a nut element engaged in said screw-threaded bore, an axial hole in said nut wherein said shank is slidable, an annular series of holes in said nut to afford passage for hydraulic fluid therethrough and a compression coil spring located about said shank and abutting said head and said nut.

References Cited

UNITED STATES PATENTS

| 2,490,510 | 12/1949 | Carleton | 137—108 |
| 2,495,879 | 1/1950 | Vander Velde | 137—108 |
| 2,696,828 | 12/1954 | Husing | 137—108 |

LEONARD D. CHRISTIAN, *Primary Examiner.*

U.S. Cl. X.R.

251—149.1